US012380463B2

(12) United States Patent
Scholtes Kennedy et al.

(10) Patent No.: US 12,380,463 B2
(45) Date of Patent: *Aug. 5, 2025

(54) SYSTEMS AND METHODS FOR VALIDATING COUPONS

(71) Applicant: Walmart Apollo, LLC, Bentonville, AR (US)

(72) Inventors: Cynthia M. Scholtes Kennedy, Pea Ridge, AR (US); William Polidore, Jr., Centerton, AR (US); Benjamin H. Scott, Centerton, AR (US); Jason A. Wolf, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,911

(22) Filed: Jul. 10, 2023

(65) Prior Publication Data

US 2023/0351429 A1    Nov. 2, 2023

Related U.S. Application Data

(63) Continuation of application No. 17/726,652, filed on Apr. 22, 2022, now Pat. No. 11,775,997.

(Continued)

(51) Int. Cl.
G06Q 30/00     (2023.01)
G06Q 30/0207   (2023.01)
G05B 19/418    (2006.01)

(52) U.S. Cl.
CPC .............................. G06Q 30/0207 (2013.01)

(58) Field of Classification Search
CPC .................................................. G06Q 30/0207
See application file for complete search history.

(56) References Cited

U.S. PATENT DOCUMENTS 8,533,045 B1     9/2013  Cunningham
2009/0018908 A1* 1/2009  Dersovitz ............. G06Q 30/02
                                              705/14.39

(Continued)

OTHER PUBLICATIONS

"Secure Electronic Coupons". IEEE. 2015 (Year: 2015).*

(Continued)

*Primary Examiner* — Maria V Vanderhorst
(74) *Attorney, Agent, or Firm* — Fitch, Even, Tabin & Flannery LLP

(57) ABSTRACT

In some embodiments, a system for electronically validating coupons comprises a primary positive coupon database containing positive coupon data. The positive coupon data relates to one or more coupons known to the valid. The system further includes a computing system comprising a control circuit configured to execute a processing module that, when executed, receives electronic coupon data from a coupon comprising a machine-readable code, parses the electronic coupon data, compares the parsed electronic coupon data to the positive coupon data in the primary positive coupon database, and determines whether the coupon is valid by determining whether there is a match between the parsed electronic coupon data and the positive coupon data, and determining whether the coupon has expired based on an expiration date of the coupon contained in the parsed electronic coupon data and an identified expiration date.

20 Claims, 5 Drawing Sheets

Related U.S. Application Data

(60) Provisional application No. 63/179,081, filed on Apr. 23, 2021.

(56) References Cited

U.S. PATENT DOCUMENTS

| | | | | |
|---|---|---|---|---|
| 2013/0275197 | A1* | 10/2013 | Thibedeau | G06Q 20/202 |
| | | | | 705/14.26 |
| 2013/0325567 | A1* | 12/2013 | Bradley | G06Q 30/02 |
| | | | | 705/14.1 |
| 2015/0379552 | A1* | 12/2015 | Kent | G06Q 20/202 |
| | | | | 705/14.38 |
| 2019/0065803 | A1 | 2/2019 | Burke | |
| 2022/0343355 | A1 | 10/2022 | Scholtes Kennedy | |

OTHER PUBLICATIONS

"Towards interoperability in mobile coupons: Enabling cross retailer coupon validation". IEEE. 2017. (Year: 2017).*

"Propositional Research Framework for the Conceptual and Technological Adoption of Digital Coupons in the US". IEEE. 2010. (Year: 2010).

U.S. Appl. No. 17/726,652; Notice of Allowance and Fees Due (PTOL-85) mailed Apr. 14, 2023; (pp. 1-12).

* cited by examiner

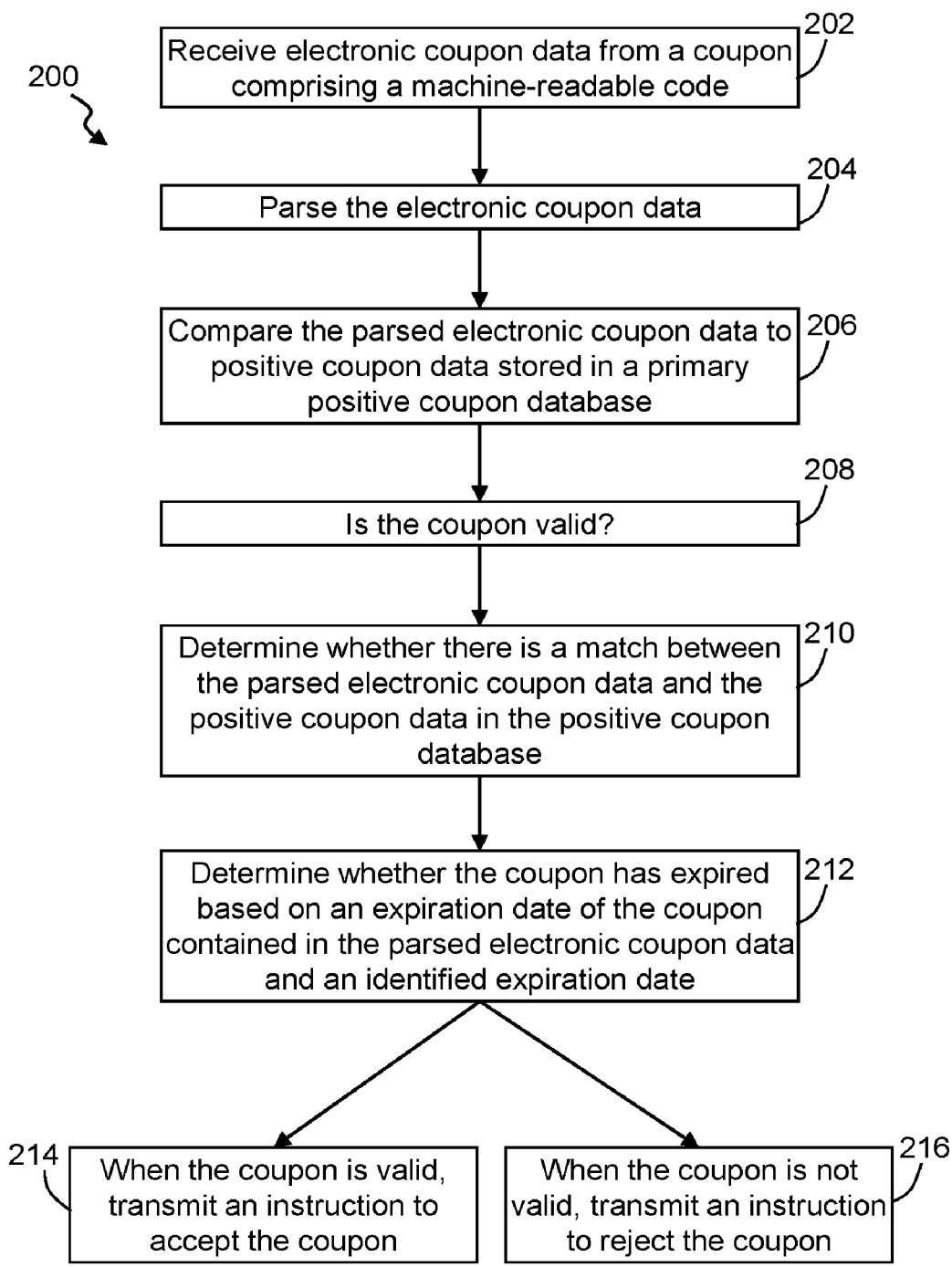

SYSTEMS AND METHODS FOR VALIDATING COUPONS

CROSS-REFERENCE TO RELATED APPLICATION

This application is a continuation of U.S. application Ser. No. 17/726,652 filed Apr. 22, 2022, now U.S. Pat. No. 11,775,997, which claims the benefit of U.S. Provisional Application No. 63/179,081 filed on Apr. 23, 2021, which are incorporated herein by reference in their entireties.

TECHNICAL FIELD

This invention relates generally to processing coupons during sales transactions and, more particularly, to electronically validating coupons during sales transactions.

BACKGROUND

Conventional methods of electronic coupon validation generally attempt to identify fraudulent or invalid coupons provided by customers by comparing the coupons to known fraudulent or invalid coupons. This method is reactive and requires fraudulent or invalid coupons to have already been received and identified by the retailer and logged in a table or database, resulting is lost revenue for retailers and manufacturers.

BRIEF DESCRIPTION OF THE DRAWINGS

Disclosed herein are embodiments of systems, apparatuses and methods pertaining to electronically validating coupons. This description includes drawings, wherein:

FIG. 2 illustrates a simplified flow diagram of an exemplary process of electronically validating coupons, in accordance with some embodiments.

Figure 1:
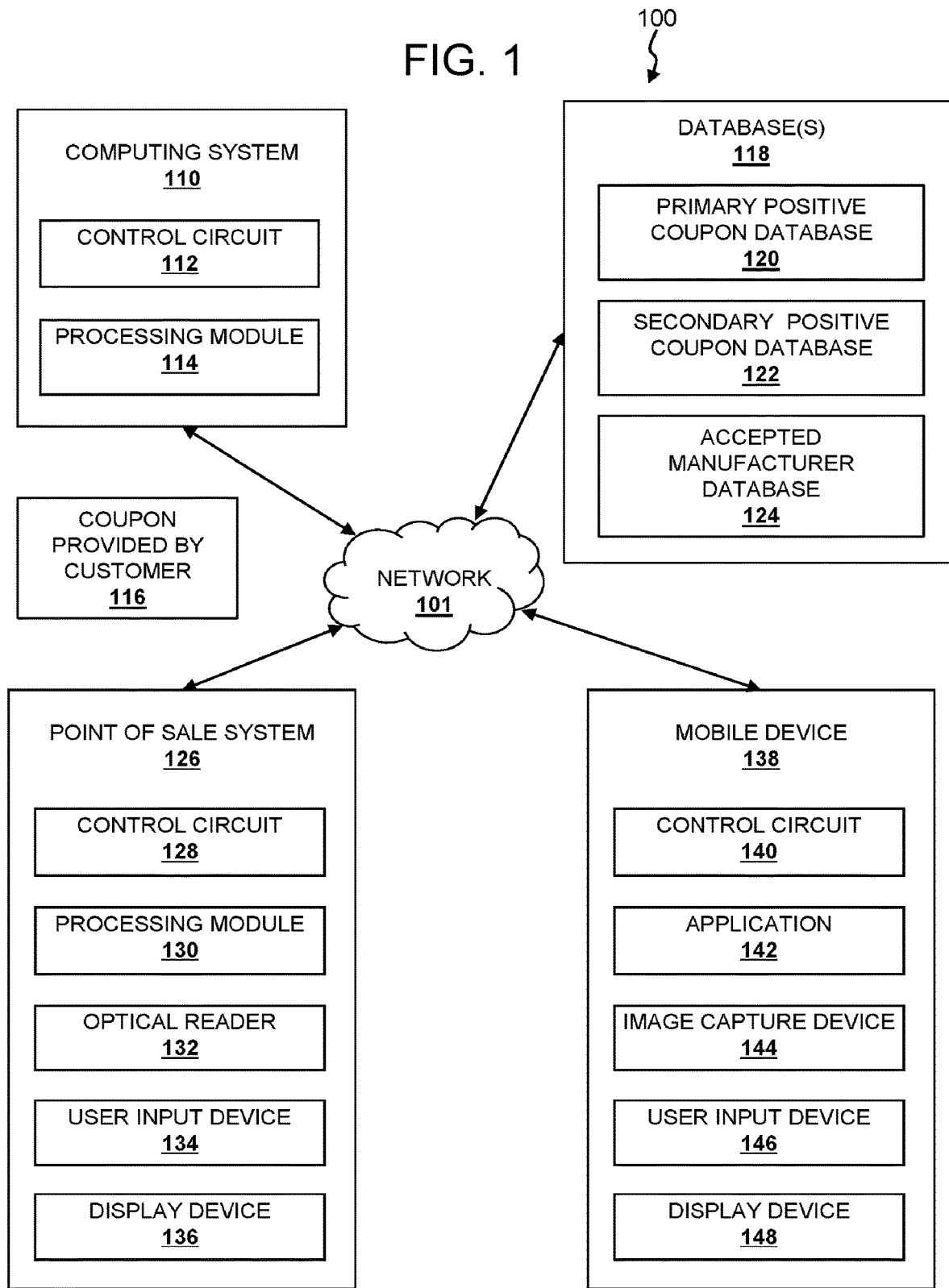
FIG. 1 illustrates a simplified block diagram of an exemplary system for electronically validating coupons, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful for electronically validating coupons, for example in a retail setting, by comparing data encoded in machine-readable coupons to stored coupons known to be valid (e.g., in one or more positive coupon databases), which may be provided by product manufacturers, vendors, etc. In this way, retailers can proactively identify fraudulent or invalid coupons more quickly and efficiently, resulting in reduced revenue loss.

In some embodiments, a system for electronically validating coupons comprises a primary positive coupon database containing positive coupon data, wherein the positive coupon data contains data elements of coupons known to the valid. The positive coupon data is generally obtained from manufacturers or vendors of retail items sold through the retailer and can also be obtained from various agents thereof. Generally, the positive coupon data is received over a distributed communication network from the manufacturers, vendors, and/or agents thereof and may be updated repeatedly at regular intervals (e.g., daily or weekly).

The system includes a computing system comprising a control circuit configured to execute a processing module. When executed, the processing module is configured to receive electronic coupon data from a coupon provided by a customer. In some embodiments, the coupon comprises a machine-readable code (e.g., a barcode) that encodes the electronic coupon data (i.e., data elements). In some approaches, the coupon may be a GS1 barcode coupon. GS1 is an organization that offer global standards for business communications, including standard for barcodes. There are many GS1 standards, such as Global Trade Item Number (GTIN) standard for barcodes. The coupon may be a physical coupon, a digital coupon, and/or an image of a coupon.

In approaches where the coupon is a physical coupon, the coupon may be scanned by an optical reader of a point-of-sale system or, in some approaches, a mobile device. In approaches where the coupon is an image of a coupon, the image may be presented via a display of a mobile device and may be scanned by an optical reader of the point-of-sale system. In approaches where the coupon is a digital coupon, the digital coupon may be downloaded or otherwise received by, for example, a mobile device and the machine-readable code read or otherwise decoded by an application executed on the mobile device.

Regardless of the device used to read the machine-readable code of the coupon, the device transmits the encoded electronic coupon data to the computing system.

The processing module of the computing system then parses the electronic coupon data. For example, the electronic coupon data may be parsed to identify data elements such as a manufacturer and/or family code, a serial number, a discount value, an expiration date, and/or the like. The processing module compares the electronic coupon data to the positive coupon data in the primary positive coupon database and determines whether the coupon is valid by determining whether there is a match between the electronic coupon data and the positive coupon data and determining whether the coupon has expired based on an expiration date of the coupon contained in the electronic coupon data and a target expiration end date.

In some approaches, the coupon validation may depend on the presence or absence of various identifiers parsed from the electronic coupon data. For example, prior to comparing the electronic coupon data to the positive coupon data, the processing module may determine whether the manufacturer code and/or family code is associated with an accepted manufacturer. If not, the processing module may flag the coupon as non-compliant.

In some approaches, where there is no match between the parsed electronic coupon data and the positive coupon data, the processing module may remove the serial number from the electronic coupon data and repeat comparing the electronic coupon data to the positive coupon data in the primary positive coupon database. In some approaches, if the processing module cannot identify a serial number from the electronic coupon data, determines there is no match between the electronic coupon data and the positive coupon data, the processing module may compare the electronic coupon data to data associated with one or more specialty coupons stored in a secondary positive coupon database.

In instances where the processing module determines that the coupon provided by the customer is valid, the processing module is configured to transmit an instruction to accept the coupon to, for example, the device or system from which the electronic coupon data was received (e.g., the point-of sale system, the mobile device, etc.) In instances where the processing module determines that the coupon provided by the customer is not valid or is fraudulent, the processing module transmits an instruction to reject the coupon.

The terms "invalid", "not valid," and "fraudulent" as used herein refer to coupons that are non-compliant and/or cannot be validated by the system. Non-limiting examples of such coupons may be those that have expired, are counterfeit, have a future effective date, are from an unaffiliated or unapproved manufacturer, and the like.

FIG. 1 depicts an exemplary system 100 for electronically validating coupons. The system includes a computing system 110, one or more coupons 116 provided by a customer, and one or more databases 118 (e.g., primary positive coupon database 120, secondary positive coupon database 122, and accepted manufacturer database 124). The one or more databases 118 are configured to store data associated with, for example, positive coupon data, specialty coupon data, and/or accepted manufacturers. The system 100 may also include one or more of a point-of-sale system 126 and a mobile device 138. The computing system 110, one or more databases 118, point-of-sale system 126, and mobile device 138 are communicatively coupled via a network 101. The network 101 can be of any suitable type. For example, the network 101 can include a local area network (LAN) and/or wide area network (WAN), such as the Internet. The network can include wired and/or wireless links and all other relays, switches, transceivers, and/or networking components.

The computing system 110 generally includes a control circuit 112 and a processing module 114. The processing module 114, when executed by the control circuit 112, is configured to receive electronic coupon data from a coupon 116 comprising a machine-readable code and to query the database(s) 118 when making determinations as to the validity of a coupon 116 provided by a customer. In some embodiments, the processing module includes computer readable instructions or code that when executed by the control circuit perform several functions including those described herein. In some approaches, the computing system 110 may be associated or otherwise affiliated with a retailer.

The control circuit 112 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 112 is configured (for example, by using corresponding programming as will be well understood by those skilled in the art) to carry out one or more of the steps, actions, and/or functions described herein. Additionally, in one embodiment, the control circuit 112 can be implemented at a server.

By one optional approach the control circuit 112 operably couples to a memory. The memory may be integral to the control circuit 112 and/or can be physically discrete (in whole or in part) from the control circuit 112 as desired. This memory can also be local with respect to the control circuit 112 (where, for example, both share a common circuit board, chassis, power supply, and/or housing) or can be partially or wholly remote with respect to the control circuit 112 (where, for example, the memory is physically located in another facility, metropolitan area, or even country as compared to the control circuit 112).

This memory can serve, for example, to non-transitorily store the computer instructions that, when executed by the control circuit 112, cause the control circuit 112 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The coupon 116 may take the form of any suitable machine-readable coupon, including, but not limited to, a physical coupon, a digital coupon, an image of a coupon, or the like, and the machine-readable code may be scanned or read by any suitable device. Suitable coupon types include any standardized paper or digital coupon containing a machine-readable code. For example, in some approaches the coupon may be a barcode-based paper or digital coupon, such as GS1 DataBar coupon or a UPC coupon. The machine-readable code of the coupon contains various data elements (i.e., electronic coupon data) encoded therein. For example, the machine-readable code may include one or more of a manufacturer code, a family code, a serial number, an offer code, a save value, a start date, an expiration date, a purchase requirement code, an application identification, etc. This description of possible data elements is not exhaustive and may include any suitable data element(s).

The scanned or read electronic coupon data is transmitted to the computing system 110, for example, over network 101, and the processing module 114 of the computing system 110 parses the electronic coupon data into one or more of the data elements described above.

In some approaches, the processing module 114 may identify a manufacturer code in the parsed electronic coupon data and may determine whether the manufacturer code is associated with an accepted manufacturer. An accepted manufacturer may be a manufacturer that has opted into a positive coupon validation program or, in some approaches, has not opted out of such a program. The processing module when executed queries a database of accepted manufacturers 124 and attempts to match the parsed manufacturer code of the coupon with a manufacturer in the database of accepted manufacturers 124. In some approaches, a "match" is an exact match of all the digits or symbols of the manufacturer code. If the manufacturer code is not matched with an accepted manufacturer, in some approaches the processing module 114 may flag or otherwise reject the coupon 116 as non-compliant. In another approach, if the manufacturer code is not matched with an accepted manufacturer, the processing module 114 may attempt to validate the coupon 116 using a negative coupon validation system.

If the manufacturer code is matched with an accepted manufacturer, the processing module 114 when executed is configured to determine whether the coupon 116 is valid by determining whether there is a match between the parsed electronic coupon data and positive coupon data in the primary positive coupon database 120. The primary positive coupon database 120 contains positive coupon data relating to one or more coupons known to the valid. These one or more coupons known to be valid are generally provided to the retailer by manufacturers (or agents thereof (e.g., daily or weekly). In some approaches, a "match" is an exact match of all the digits or symbols of one or more data elements of the machine-readable code and, in some approaches, all of the digits or symbols of all of the data elements present in the machine-readable code. If there is a match, the processing module 114 determines whether the coupon has expired. In some approaches the processing module 114 determines that the coupon has expired by comparing an expiration date of the coupon contained in the parsed electronic coupon data and to an identified expiration date, for example in the positive coupon data. In other approaches, the processing module may determine whether the coupon has expired by comparing the expiration date of the coupon with the current date.

When there is not a match between the electronic coupon data and the positive coupon data and/or the coupon is determined to be expired, the processing module 114 may deem the coupon 116 to be invalid and may transmit an instruction to reject the coupon. When there is a match between the electronic coupon data and the positive coupon data and the coupon is determined to be unexpired, the processing module 114 may deem the coupon 116 to be valid and may transmit an instruction to accept the coupon. In some approaches, the processing module may be configured to transmit the instruction to the device from which the electronic coupon data was received (e.g., the point-of-sale system, mobile device, etc.)

In some approaches, the coupon provided by the customer may have one or more dynamic data elements encoded in the machine-readable code. For example, some coupons that are printed or otherwise generated by the customer can have dynamic fields such as, for example, a dynamic serial number, which changes every time the coupon is printed or generated and/or a dynamic expiration date, which is based on the date the coupon is printed or generated. In these scenarios, the processing module may identify these dynamic fields and may strip them from the electronic coupon data so that the remaining data elements of the electronic coupon data may be searched against the positive coupon data in the primary positive coupon database to determine a match. When there is a match, and the coupon is determined to be unexpired, the processing module 114 may deem the coupon 116 to be valid and may transmit an instruction to accept the coupon. If no match is determined, the processing module 114 may deem the coupon 116 as invalid and may transmit an instruction to reject the coupon.

In some approaches, the electronic coupon data may include a serial number (e.g., the coupon is serialized), and the serial number prevent may prevent a match occurring between the electronic coupon data and the positive coupon data. For example, the serial number may be a dynamic serial number that is not recognized by the system as being dynamic. In such a scenario, where the processing module 114 determines there is no match between the parsed electronic coupon data and the positive coupon data, and the processing module 114 is able to identify a serial number in the parsed electronic coupon data, the processing module 114 may be configured to remove the serial number from the parsed electronic coupon data, and repeat comparing the parsed electronic coupon data to the positive coupon data in the primary positive coupon database 120. If a match is then determined, the processing module 114 proceeds to validate the expiration date of the coupon. If no match is determined, the processing module 114 may query the secondary positive coupon database 122, which contains data relating to coupons that are unique or obscure, one-off coupons, and/or other types of specialty coupons that are not included in the primary positive coupon database. If a match is determined, the processing module 114 proceeds to validate the expiration date as described above. If no match is determined, the processing module 114 may deem the coupon 116 as invalid and may transmit an instruction to reject the coupon.

In some approaches, the electronic coupon data may not include a serial number. In such a scenario, where the processing module 114 is unable to identify a serial number in the parsed electronic coupon data, and the processing module 114 determines there is no match between the parsed electronic coupon data and the positive coupon data, and the processing module 114 may be configured to query the secondary positive coupon database 122. If a match is determined, the processing module 114 proceeds to validate the expiration date as described above. If no match is determined, the processing module 114 may deem the coupon 116 as invalid and may transmit an instruction to reject the coupon.

In some approaches, the system 100 may include a point-of-sale system 126. The point-of-sale system 126 can take any suitable form, based on the ecosystem in which it operates. For example, in a brick-and-mortar setting, the point-of-sale system 126 may include a staffed or unstaffed point-of-sale terminal at which a customer can purchase products. The point-of-sale system 126 may include a processing module 130 executable by a control circuit 128. The control circuit 128 can be implemented through one or more processors, controllers, central processing units, logic, software and the like. Further, in some implementations the control circuit 128 may provide multiprocessor functionality. The point-of-sale system may also include an optical reader 132. The optical reader may comprise any suitable device capable of optically reading machine-readable codes (e.g., bar codes, QR codes, etc.). In some approaches, the optical reader 132 may be a barcode scanner. The optical reader 132 reads the machine-readable code on the coupon provided by the customer and the processing module 130 executed by the control circuit 128 transmits the electronic coupon data to the computing system 110. The computing system 110 then determines if the coupon is valid as described above.

Depending on whether the coupon is determined to be valid or invalid, the computing system 110 provides an instruction to the point-of-sale system 126 to accept or reject the coupon 116. In some approaches, the instruction may be displayed on a display device 136 associated with the point-of-sale system 126. The display device 136 may comprise, for example, a light emitting diode (LED), a liquid crystal display (LCD), etc.), or the like. The point-of-sale system 126 may also include a user input device 134, such as, for example, a keyboard, trackpad, number pad, etc. In some embodiments, the display device 136 and user input device 134 are integrated into a single component, such as a touchscreen.

In an online ecosystem, the point-of-sale system 126 can include backend servers (e.g., the point-of-sale system 126 may be cloud-based) that allow the customer to conduct some or all of a purchase transaction via the customer's mobile device 138, computer, automotive infotainment system, etc. While these are just two examples, other possibilities, and combinations, of online and/or brick-and-mortar facilities exist. For example, a customer may be able to purchase items online as well as in-store, purchase items in-store in a scan-and-go manner (i.e., without the use of a traditional point-of-sale terminal), etc., and the point-of-sale system 126 is adaptable to accommodate a variety of embodiments.

The mobile device 138 can be of any suitable type. For example, the mobile device 138 can be smartphone, cellular telephone, tablet, portable computer, laptop computer, personal digital assistant, wearable device, media player, etc. operable by a user, for example a customer, and may be used to complete some or all of the steps of a purchase transaction. The mobile device 138 includes a display device 148 (e.g., a light emitting diode (LED), liquid crystal display (LCD), etc.) and a user input device 146 (e.g., a keyboard, trackpad, number pad, etc.). In some embodiments, the display device 148 and user input device 146 are integrated into a single component, such as a touchscreen. The mobile device 138 may include an image capture device 144 (e.g., a camera) and is configured to capture images of, and/or to read machine-readable codes, associated with one or more coupons. For example, in approaches where the mobile device 138 is used to complete a purchase transaction, the image capture device 144 may capture an image of a physical coupon. In another approach, the image capture device 144 may optically read a machine-readable code present on a physical coupon. In yet another approach, a mobile application 142 executing on the mobile device 138 may download an image of a machine-readable code associated with a coupon.

The mobile application 142 is executable by the control circuit 140. The control circuit 140 can be implemented through one or more processors, controllers, central processing units, logic, software and the like. Further, in some implementations the control circuit 140 may provide multiprocessor functionality. In some approaches, the mobile application 142 may be associated with the retailer.

The mobile application 142 is communicably coupled to the computing system 110 and is configured to transmit to the computing system 110 electronic coupon data obtained from the coupon 116. The computing system 110 then determines if the coupon is valid. Depending on whether the coupon is determined to be valid or invalid, the computing system 110 provides an instruction to the mobile application 142 to accept or reject the coupon 116. In some approaches, the instruction may be displayed on the display device 148 associated with the mobile device 138.

FIG. 2 depicts a simplified flow diagram of an exemplary process 200 of electronically validating coupons, in accordance with some embodiments. The process 200 may be implemented using various elements and embodiments of the system 100 described herein and other systems.

In step 202, a computing system comprising a control circuit executing a processing module receives electronic coupon data from a coupon comprising a machine-readable code. The coupon is provided by a customer during a purchase transaction. In some approaches, the computing system receives the electronic coupon data from a point-of-sale system comprising an optical reader. In some approaches, the computing system receives the electronic coupon data from an application executing on a mobile device. The computing system, control circuit, processing module, point-of-sale system, optical reader, and mobile device may be computing system 110, control circuit 112, processing module 114, point-of-sale system 126, optical reader 132, and mobile device 138 described herein with reference to FIG. 1. The coupon provided by the customer may comprise coupon 116 described here with reference to FIG. 1 and may have a machine-readable code encoding various data elements, as described above.

In step 204, the processing module parses electronic coupon data into various data elements. For example, the electronic coupon data may be parsed to identify a manufacturer and/or family code, a serial number, a discount value, an expiration date, and/or the like. If the processing module is unable to parse the electronic coupon data, the processing module may deem the coupon to be invalid and/or may provide an instruction to reject the coupon.

In step 206, the processing module compares the parsed electronic coupon data to positive coupon data stored in a primary positive coupon database. The positive coupon data contains data elements of coupons known to the valid. The positive coupon data is generally obtained from manufacturers or vendors of retail items sold through the retailer and can also be obtained from various agents thereof and may be updated at regular intervals (e.g., daily or weekly).

In some approaches, prior to comparing the parsed electronic coupon data to the positive coupon data on step 206, the processing module may identify a manufacturer code in the parsed electronic coupon data. In response to identifying the manufacturer code, the processing module may determine whether the manufacturer code is associated with an accepted manufacturer. An accepted manufacturer may be a manufacturer that has opted into a positive coupon validation program or, in some approaches, has not opted out of such a program.

The processing module when executed queries a database of accepted manufacturers and attempts to match the parsed manufacturer code of the coupon with a manufacturer in the database of accepted manufacturers. In some approaches, a "match" is an exact match of all the digits or symbols of the manufacturer code. If the manufacturer code is not matched with an accepted manufacturer, the processing module may flag or otherwise reject the coupon as non-compliant. In another approach, if the manufacturer code is not matched with an accepted manufacturer, the processing module may attempt to validate the coupon using a negative coupon validation system.

If the manufacturer code is matched with an accepted manufacturer, the processing module when executed is configured to determine whether the coupon is valid by determining whether there is a match between the parsed electronic coupon data and positive coupon data in the primary positive coupon database.

In step 208, the processing module determines whether the coupon provided by the customer is valid as described in steps 210 and 212. In step 210, the processing module determines whether there is a match between the parsed electronic coupon data and the positive coupon data. In some approaches, a "match" is an exact match of all the digits or symbols of one or more data elements of the machine-readable code and, in some approaches, all of the digits or symbols of all of the data elements present in the machine-readable code.

When a match has been identified, in step 212, the processing module determines whether the coupon has expired. For example, in some approaches the processing module determines that the coupon has expired by comparing an expiration date of the coupon contained in the parsed electronic coupon data and to an identified expiration date, for example in the positive coupon data. In other approaches, the processing module may determine whether the coupon has expired by comparing the expiration date of the coupon with the current date.

In step 214, when the processing module determines that the coupon provided by the customer is valid, the processing module transmits an instruction to accept the coupon. In step 216, when the processing module determines that the coupon provided by the customer is not valid, the processing module transmits an instruction to reject the coupon. The instructions described in steps 214 and 216 may be transmitted by the computing system to the device and/or system which transmitted the electronic coupon data to the computing system. For example, in some approaches, the instruction may be transmitted to, (and displayed by) a point-of-sale system. In other approaches, the instruction may be transmitted to (and displayed by) a mobile device.

In some approaches, the electronic coupon data may include a serial number, and the serial number may prevent a match occurring between the electronic coupon data and the positive coupon data. For example, the serial number may be a dynamic serial number, and in some approaches, the processing module may not recognize the serial number as being dynamic. In such a scenario, where the processing module determines there is no match between the parsed electronic coupon data and the positive coupon data, and the processing module is able to identify a serial number in the parsed electronic coupon data, the processing module may be configured to remove the serial number from the parsed electronic coupon data, and repeat comparing the parsed electronic coupon data to the positive coupon data in the primary positive coupon database as described in step 206. If a match is then determined in step 210, the processing module proceeds to validate the expiration date as described in step 212.

If no match is determined, the processing module may query a secondary positive coupon database, which contains data relating to coupons that are unique or obscure, one-off coupons, and/or other types of specialty coupons that are not included in the primary positive coupon database. If a match is then determined, the processing module proceeds to validate the expiration date as described above. If no match is determined, the processing module may deem the coupon as invalid and may transmit an instruction to reject the coupon.

In some approaches, the electronic coupon data may not include a serial number. In such a scenario, where the processing module is unable to identify a serial number in the parsed electronic coupon data, and the processing module determines there is no match between the parsed electronic coupon data and the positive coupon data in step 210, the processing module may be configured to query the secondary positive coupon database. If a match is then determined, the processing module proceeds to validate the expiration date as described above. If no match is determined, the processing module may deem the coupon as invalid and may transmit an instruction to reject the coupon.

Figure 3A:
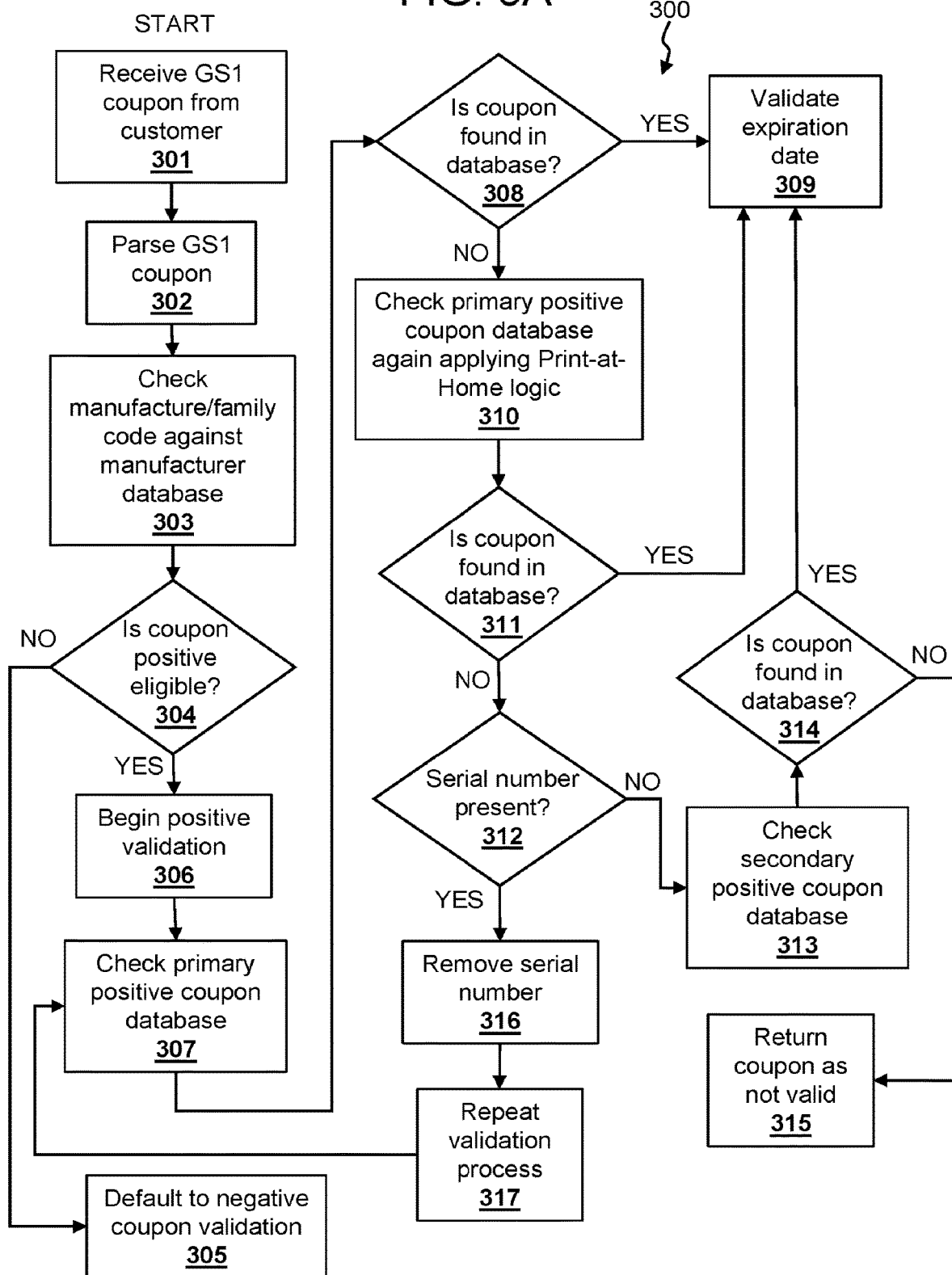
FIG. 3A illustrates a simplified flow diagram of an exemplary process of positively validating coupons electronically, in accordance with some embodiments.
Figure 3B:
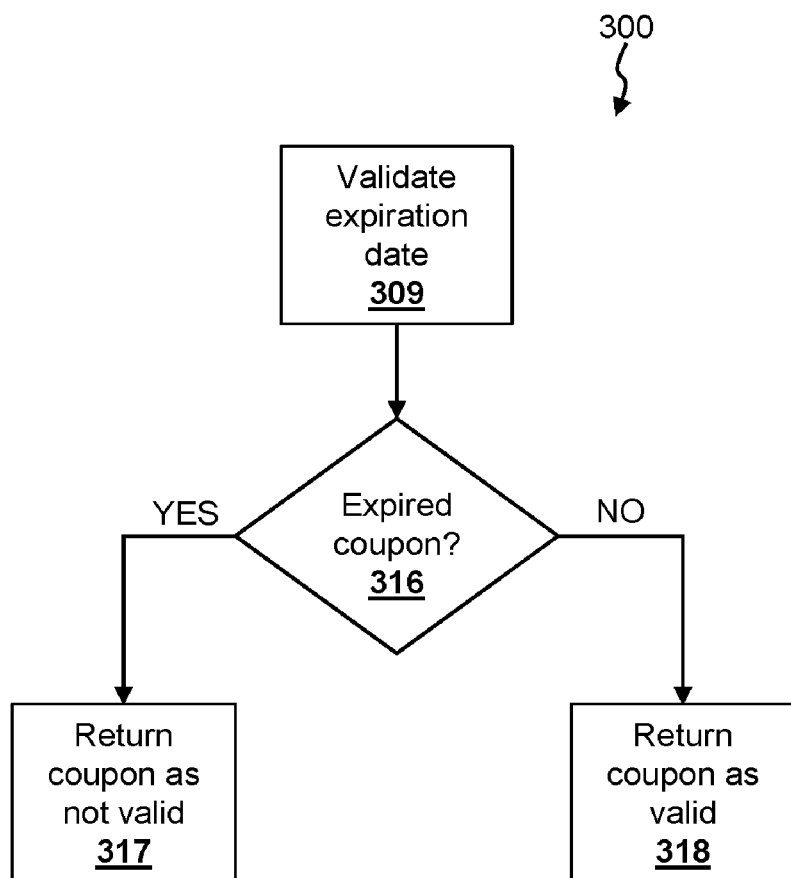
FIG. 3B illustrates a simplified flow diagram of an exemplary process of positively validating coupons electronically, in accordance with some embodiments.

FIG. 3A and FIG. 3B depict simplified flow diagrams of an exemplary process 300 of positively validating coupons electronically, in accordance with some embodiments. The process 300 may be implemented using various elements and embodiments of the system 100 described herein and other systems. The exemplary process 300 of positively validating coupons will be discussed in the context of a customer shopping at a brick-and-mortar retailer. However, the exemplary process 300 may be equally applicable to scenarios where some or all of the purchase transaction takes place online using one or more computer devices and/or mobile devices.

Turning to FIG. 3A, at block 301, the customer presents a paper coupon at a point-of-sale terminal to purchase a particular product. The coupon includes a GS1 DataBar barcode, which encodes various data elements (i.e., electronic coupon data) as described herein with reference to FIG. 1. In this particular example, the GS1 coupon is received and scanned by a cashier using an optical reader associated with the point-of-sale terminal. In some approaches, the customer may scan the GS1 coupon at a self-service point-of-sale terminal. In some approaches, some of the steps of the purchase transaction may be performed by the customer using a mobile device.

At block 302, the system parses the GS1 coupon to identity individual data elements encoded therein. In this particular example, the GS1 coupon includes at least a manufacturer/family code, a discount value, and an expiration date, If the system is unable to parse the GS1 coupon, the coupon is rejected. That is, the system provides an alert or instruction to the point-of-sale terminal that the coupon is invalid or otherwise rejected. If the system successfully parses the GS1 coupon, the system proceeds to block 303.

At block 303, the system checks the manufacturer/family code against a database of known manufacturers and at block 304 the system determines if the coupon is "positive-eligible" (i.e., eligible to be validated by the positive coupon validation systems and methods described herein). The database of known manufacturers is populated with manufacturers that are known to participate in the positive coupon validation program. Some manufacturers may not participate and, thus, are not included in the database. Accordingly, coupons provided by those manufacturers would not be positive-eligible.

The database may be populated by the manufacturers themselves, by the retailer, and/or by one or more agents thereof. The positive validation system queries the manufacturer database to determine a match between the manufacturer/family code in the GS1 coupon provided by the customer, which identifies the manufacturer who supplied the coupon, and a known manufacturer in the database. When no match is determined, the coupon is deemed to be not positive-eligible and the system proceeds to block 305, wherein the coupon may be validated using a negative coupon validation method. When a match is determined, the coupon is deemed to be positive-eligible and the system proceeds to block 306 to initiate the positive validation process.

The positive validation process begins with block 307. At block 307, the system queries a primary positive coupon database to determine if there is a match between the GS1 barcode of the coupon provided by the customer and a GS1 barcode in the primary positive coupon database. The primary positive coupon database is populated with GS1 barcodes of coupons known to be valid, which are routinely provided by participating manufacturers, vendors, and/or agents thereof (e.g., daily). The system searches for an exact match between the GS1 barcode of the coupon provided by the customer and a GS1 barcode in the primary positive coupon database. If the system determines an exact match at block 308, the system proceeds to validate the expiration date of the coupon at block 309.

If no match is determined at block 308, the system at block 310 queries the primary positive coupon database again applying a "print-at-home" (or "serialized") logic. Some digital coupons can be printed by the customer (e.g., at home) to produce paper coupons, or otherwise generated by the customer electronically. These printed coupons, which may be automatically generated, are sometimes called "print-at-home" coupons (or "serialized" coupons) and can have dynamic fields, for example, based on when the coupon is printed or generated and by whom. For instance, a print-at-home or serialized coupon can have a dynamic serial number, which changes every time the coupon is printed or generated. In another example, a print-at-home or serialized coupon may have a dynamic expiration date, which may be based on the date the coupon is printed or generated. Other dynamic fields are also contemplated.

To account for dynamic fields in print-at-home and serialized coupons, manufacturers may provide, in the positive coupon data transmitted to the retailer, placeholder values for the dynamic fields. These placeholder values indicate to the retailer that dynamic fields are present in print-at-home and serialized coupons from that manufacturer. If the positive validation system identifies a placeholder value in the positive coupon data associated with a particular manufacturer's print-at-home or serialized coupon, thereby identifying a dynamic field in that manufacture's print-at-home or serialized coupon, the system is configured to truncate or remove the identified dynamic field in the GS1 barcode of the coupon provided by the customer. For example, the manufacturer provides a placeholder value for the serial number of a particular print-at-home or serialized coupon. The positive validation system recognizes this and removes the serial number from the GS1 barcode of the coupon provided by the customer.

The system then queries the primary positive coupon database again searching for a match using the remaining data elements in the GS1 coupon barcode. If the system at block 311 determines a match in the primary positive coupon database using the remaining data elements in the customer's GS1 coupon barcode after stripping out the dynamic data elements, the system at block 309 proceeds to validate the expiration date of the coupon.

If no match is determined at block 311, the system at block 312 determines if a serial number is present in the barcode of the GS1 coupon provided by the customer. In some scenarios, the manufacturer of a coupon may not provide to the retailer a place holder serial number to indicate the presence of a dynamic field in a print-at-home or serialized coupon. In such a scenario, the positive coupon validation system may not be able recognize that the serial number of the GS1 coupon is dynamic and, when searched against the positive coupon data, may not find a match. To address this possibility, at block 316 the system removes the serial number from the GS1 coupon barcode and at block 317 the system repeats the validation process using the remaining data elements in the GS1 coupon. Specifically, the system proceeds back to block 307 and queries the primary positive coupon database again searching for a match using the remaining data elements in the customer's GS1 coupon.

If no serial number is present in the GS1 coupon barcode at block 312, the system at block 313 queries a secondary positive coupon database searching for a match using one or more data elements present in the coupon barcode. The secondary positive coupon database generally includes coupons that are unique or obscure, one-off coupons, and/or other types of specialty coupons not included in the primary positive coupon database.

If the system at block 314 determines a match in the secondary positive coupon database using one or more data present elements in the coupon barcode, the system at block 309 proceeds to validate the expiration date of the coupon. If the system at block 314 determines there is no match in the secondary positive coupon database using one or more data elements present in the customer's GS1 coupon, the system at block 315 provides an alert or instruction to flag the coupon as "not valid" and to return the coupon to the customer as such.

At block 309, the expiration date of the GS1 coupon is validated. If, at block 316, the system determines that the coupon has expired, the system at block 317 provides an alert or instruction to flag the coupon as "not valid" and to return the coupon to the customer as such. If the system determines the coupon has not expired, the system at block 318 provides an alert or instruction to flag the coupon as "valid" and to return the coupon to the customer as such. The alerts and/or instructions may be provided to, for example, the point-of-sale terminal.

Another exemplary, non-limiting example of a process for positively validating coupons will now be described. The process may be implemented using various elements and embodiments of the system 100 described herein and other systems. This exemplary process may be applicable with both paper and electronic coupons, and may be applicable to any purchase transaction or coupon redemption scenario (e.g., in a brick and mortar store, online, etc.)

When a customer presents a coupon for redemption (e.g., in a brick and mortar store, online, etc.), the coupon is scanned (e.g., at a point of sale terminal, by a mobile device, etc.). The system parses the GS1 coupon to identity individual data elements encoded therein. The system then retrieves the Manufacturer Number (i.e., the Primary Company Prefix) from the GS1 to determine if the coupon manufacturer is one of the supported manufacturers for Positive File coupon validation.

If so, the system performs a lookup in a Positive File. The Positive File may be a database that is populated with GS1 barcodes of coupons known to be valid. The system queries the Positive File and checks for an exact match on the coupon. If there is an exact match, the system approves the coupon, and the validation process is complete. If there is no match, the system applies specific "Print at Home/Serialized" logic and the system checks that either the expiration date, the serial number, or both are present.

If either or both the expiration date and serial number are present, the system performs another query of the Positive File, but this time the system checks for an exact match on all fields except for the expiration date and serial number. If there is an exact match, the system approves the coupon, and the validation process is complete. If there is no match, the system checks if the serial number is present. If the serial number is present, the system removes the serial number from the coupon and the system performs another query of the Positive File. If there is an exact match, the system approves the coupon, and the validation process is complete. If there is no match, the system may again apply the "Print at Home/Paper Serialized" logic. If the serial number is not present, the system may then query a Manual Entry Table (i.e., a secondary positive coupon database). The Manual Entry Table may contain, for example, one-off coupons, specialty coupons, and the like, as well as any coupons that a manufacturer may request be manually entered to prevent the coupons from being rejected upon redemption. If there is an exact match, the coupon is approved, and the validation process is complete. If there is no match, the coupon is rejected, and the validation process is complete.

If neither the expiration date nor the serial number are present, it can be assumed that the customer's coupon is not present in the Positive File. The system may then perform a query of the Manual Entry Table. If there is an exact match, the coupon is approved, and the validation process is complete. If there is no match, the coupon is rejected, and the validation process is complete.

Figure 4:
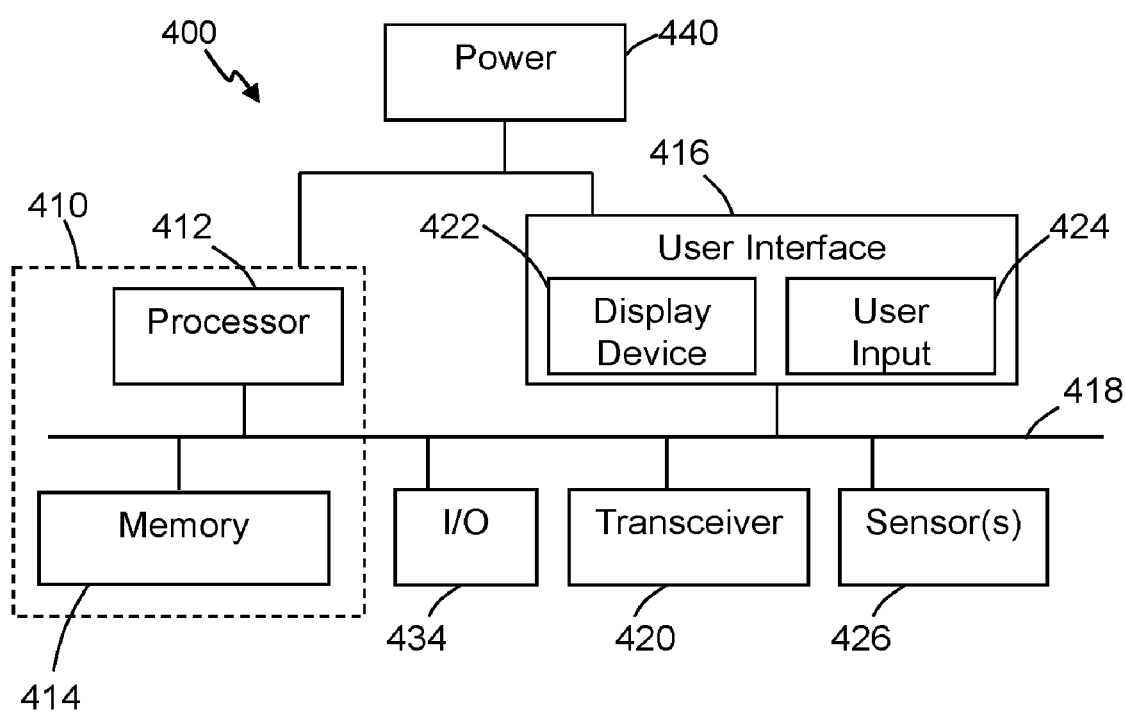
FIG. 4 illustrates an exemplary system for use in implementing methods, techniques, devices, apparatuses, systems, servers, and sources for positively validating coupons, accordance with some embodiments.

The circuits, circuitry, systems, devices, processes, methods, techniques, functionality, services, servers, sources and the like described herein may be utilized, implemented and/or run on many different types of devices and/or systems. FIG. 4 illustrates an exemplary system 400 that may be used for implementing the methods illustrated in FIGS. 2, 3A, and 3B, as well as any of the components, circuits, circuitry, systems, functionality, apparatuses, processes, or devices of the positive coupon validation system 100, the computing system 110, the database(s) 118, the point-of-sale system 126, the mobile device 138, and/or other above or below mentioned systems or devices, or parts of such circuits, circuitry, functionality, systems, apparatuses, processes, or devices. However, the use of the system 400 or any portion thereof is certainly not required.

By way of example, the system 400 may comprise a control circuit or processor 412, memory 414, and one or more communication links, paths, buses or the like 418. Some embodiments may include one or more user interfaces 416, and/or one or more internal and/or external power sources or supplies 440. The processor 412 (which may form all or part of control circuit 112) can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 412 can be part of control circuitry and/or a control system 410, which may be implemented through one or more processors with access to one or more memory 414 that can store instructions, code and the like that is implemented by the control circuit and/or processors to implement intended functionality, processing modules, and the like. In some applications, the control circuit and/or memory may be distributed over a communications network (e.g., LAN, WAN, Internet) providing distributed and/or redundant processing and functionality. Again, the system 400 may be used to implement one or more of the above or below, or parts of, components, circuits, systems, processes and the like.

The user interface 416 can allow a user to interact with the system 400 and receive information through the system. In some instances, the user interface 416 includes a display 422 and/or one or more user inputs 424, such as buttons, touch screen, track ball, keyboard, mouse, etc., which can be part of or wired or wirelessly coupled with the system 400. Typically, the system 400 further includes one or more communication interfaces, ports, transceivers 420 and the like allowing the system 400 to communicate over a communication bus, a distributed computer and/or communication network 418 (e.g., a local area network (LAN), the Internet, wide area network (WAN), etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) ports 434 that allow one or more devices to couple with the system 400. The I/O ports can be substantially any relevant port or combinations of ports, such as but not limited to USB, Ethernet, or other such ports. The I/O interface 434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 426 to provide information to the system and/or sensor information that is communicated to another component, such as the control circuit 112 and databases 118. The sensors can include substantially any relevant sensor, such as distance measurement sensors (e.g., optical units, sound/ultrasound units, etc.), optical-based scanning sensors to sense and read optical patterns (e.g., bar codes, QR codes, etc.), imaging sensors, cameras, other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor readable and/or computer readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices (SSDs) or drives, hard disk drive (HDDs), one or more of universal serial bus (USB) stick or drive, flash memory secure digital (SD) card, other memory cards, and other such memory or combinations of two or more of such memory, and some or all of the memory may be distributed at multiple locations over a computer network. The memory 414 can store code, software, executables, scripts, data, content, lists, programming, programs, log or history data, user information, coupon information, manufacturer information, customer information, product information, and the like. While FIG. 4 illustrates the various components being coupled together via a bus, it is understood that the various components may actually be coupled to the control circuit and/or one or more other components directly.

In some embodiments, a system for electronically validating coupons comprises: a primary positive coupon database containing positive coupon data, wherein the positive coupon data relates to one or more coupons known to the valid; a computing system comprising a control circuit configured to execute a processing module that when executed: receives electronic coupon data from a coupon comprising a machine-readable code, the coupon provided by a customer; parses the electronic coupon data; compares the parsed electronic coupon data to the positive coupon data in the primary positive coupon database; and determines whether the coupon is valid by: determining whether there is a match between the parsed electronic coupon data and the positive coupon data; and determining whether the coupon has expired based on an expiration date of the coupon contained in the parsed electronic coupon data and an identified expiration date.

In some embodiments, a computer-implemented method for positively validating coupons, the method comprises: receiving, at a computing system comprising a control circuit executing a processing module, electronic coupon data from a coupon comprising a machine-readable code, the coupon provided by a customer; parsing, by the processing module, the electronic coupon data; comparing, by the processing module, the parsed electronic coupon data to positive coupon data stored in a primary positive coupon database, wherein the positive coupon data relates to one or more coupons known to the valid; and determining, by the processing module, whether the coupon provided by the customer is valid by: determining whether there is a match between the parsed electronic coupon data and the positive coupon data; and determining whether the coupon has expired based on an expiration date of the coupon contained in the parsed electronic coupon data and an identified expiration date.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for electronically validating coupons, the system comprising:
 a primary positive coupon database containing positive coupon data, wherein the positive coupon data relates to one or more coupons known to the valid;
 a computing system comprising a control circuit configured to execute a processing module that when executed:
  receives electronic coupon data obtained from a coupon comprising a machine-readable code;
  electronically parses the electronic coupon data;
  queries the primary positive coupon database for a match between the parsed electronic coupon data and the positive coupon data;
  if there is no match between the parsed electronic coupon data and the positive coupon data:
   identifies one or more placeholder values indicating one or more dynamic fields in the parsed electronic coupon data;
   electronically removes the one or more placeholder values indicating the one or more dynamic fields from the parsed electronic coupon data; and
   re-queries the primary positive coupon database for a match between the remaining parsed electronic coupon data and the positive coupon data.

2. The system of claim 1, wherein if there is a match between the parsed electronic coupon data and the positive coupon data, or there is a match between the remaining parsed electronic coupon data and the positive coupon data, the processing module determines that the coupon is valid, and the processing module transmits an instruction to accept the coupon.

3. The system of claim 1, wherein if there is no match between the parsed electronic coupon data and the positive coupon data, and there is no match between the remaining parsed electronic coupon data and the positive coupon data, the processing module determines that the coupon is not valid, and the processing module transmits an instruction to reject the coupon.

4. The system of claim 1, wherein the processing module, in response to identifying a manufacturer code in the parsed electronic coupon data, and prior to querying the primary positive coupon database for a match between the parsed electronic coupon data and the positive coupon data, is configured to determine whether the manufacturer code is associated with an accepted manufacturer.

5. The system of claim 1, wherein the processing module, in response to identifying a serial number in the parsed electronic coupon data and determining there is no match between the parsed electronic coupon data and the positive coupon data, is configured to electronically remove the serial number from the parsed electronic coupon data and repeat querying the primary positive coupon database for a match between the parsed electronic coupon data and the positive coupon data.

6. The system of claim 1, wherein the processing module, in response to being unable to identify a serial number and/or one or more dynamic fields in the parsed electronic coupon data and determining there is no match between the parsed electronic coupon data and the positive coupon data, is configured to query a secondary positive coupon database for a match between the parsed electronic coupon data and data associated with one or more specialty coupons stored in the secondary positive coupon database.

7. The system of claim 1, wherein the coupon is a physical coupon.

8. The system of claim 1, wherein the computing system receives the electronic coupon data from a point-of-sale system comprising an optical reader, the point-of-sale system communicatively coupled to the computing system over a network.

9. The system of claim 1, wherein the computing system receives the electronic coupon data from an application executing on a mobile device, the mobile device communicatively coupled to the computing system over a network.

10. The system of claim 1, wherein the computing system receives, over a distributed communication network from one or more manufacturers, updated positive coupon data at regular intervals, and repeatedly updates the primary positive coupon database with the updated positive coupon data.

11. A computer-implemented method for electronically validating coupons, the method comprising:
    receiving, at a computing system comprising a control circuit executing a processing module, electronic coupon data obtained from a coupon comprising a machine-readable code;
    electronically parsing, by the processing module, the electronic coupon data;
    querying, by the processing module, a primary positive coupon database containing positive coupon data relating to one or more coupons known to be valid for a match between the parsed electronic coupon data and the positive coupon data;
    if there is no match between the parsed electronic coupon data and the positive coupon data:
        identifying, by the processing module, one or more placeholder values indicating one or more dynamic fields in the parsed electronic coupon data;
        electronically removing, by the processing module, the one or more placeholder values indicating the one or more dynamic fields from the parsed electronic coupon data; and
        re-querying, by the processing module, the primary positive coupon database for a match between the remaining parsed electronic coupon data and the positive coupon data.

12. The method of claim 11, wherein if there is a match between the parsed electronic coupon data and the positive coupon data, or there is a match between the remaining parsed electronic coupon data and the positive coupon data, the processing module determines that the coupon is valid, and the processing module transmits an instruction to accept the coupon.

13. The method of claim 11, wherein if there is no match between the parsed electronic coupon data and the positive coupon data, and there is no match between the remaining parsed electronic coupon data and the positive coupon data, the processing module determines that the coupon provided is not valid, and the processing module transmits an instruction to reject the coupon.

14. The method of claim 11, wherein the processing module, in response to identifying a manufacturer code in the parsed electronic coupon data, and prior to querying the primary positive coupon database for a match between the parsed electronic coupon data and the positive coupon data, is configured to determine whether the manufacturer code is associated with an accepted manufacturer.

15. The method of claim 11, wherein the processing module, in response to identifying a serial number in the parsed electronic coupon data and determining there is no match between the parsed electronic coupon data and the positive coupon data, is configured to electronically remove the serial number from the parsed electronic coupon data and repeat querying the primary positive coupon database for a match between the parsed electronic coupon data and the positive coupon data.

16. The method of claim 11, wherein the processing module, in response to being unable to identify a serial number and/or one or more dynamic fields in the parsed electronic coupon data and determining there is no match between the parsed electronic coupon data and the positive coupon data, is configured to query a secondary positive coupon database for a match between the parsed electronic coupon data and data associated with one or more specialty coupons stored in the secondary positive coupon database.

17. The method of claim 11, wherein the coupon is a physical coupon.

18. The method of claim 11, wherein the computing system receives the electronic coupon data from a point-of-sale system comprising an optical reader, the point-of-sale system communicatively coupled to the computing system over a network.

19. The method of claim 11, wherein the computing system receives the electronic coupon data from an application executing on a mobile device, the mobile device communicatively coupled to the computing system over a network.

20. The method of claim 11, wherein the computing system receives, over a distributed communication network from one or more manufacturers, updated positive coupon data at regular intervals, and repeatedly updates the primary positive coupon database with the updated positive coupon data.

* * * * *